UNITED STATES PATENT OFFICE.

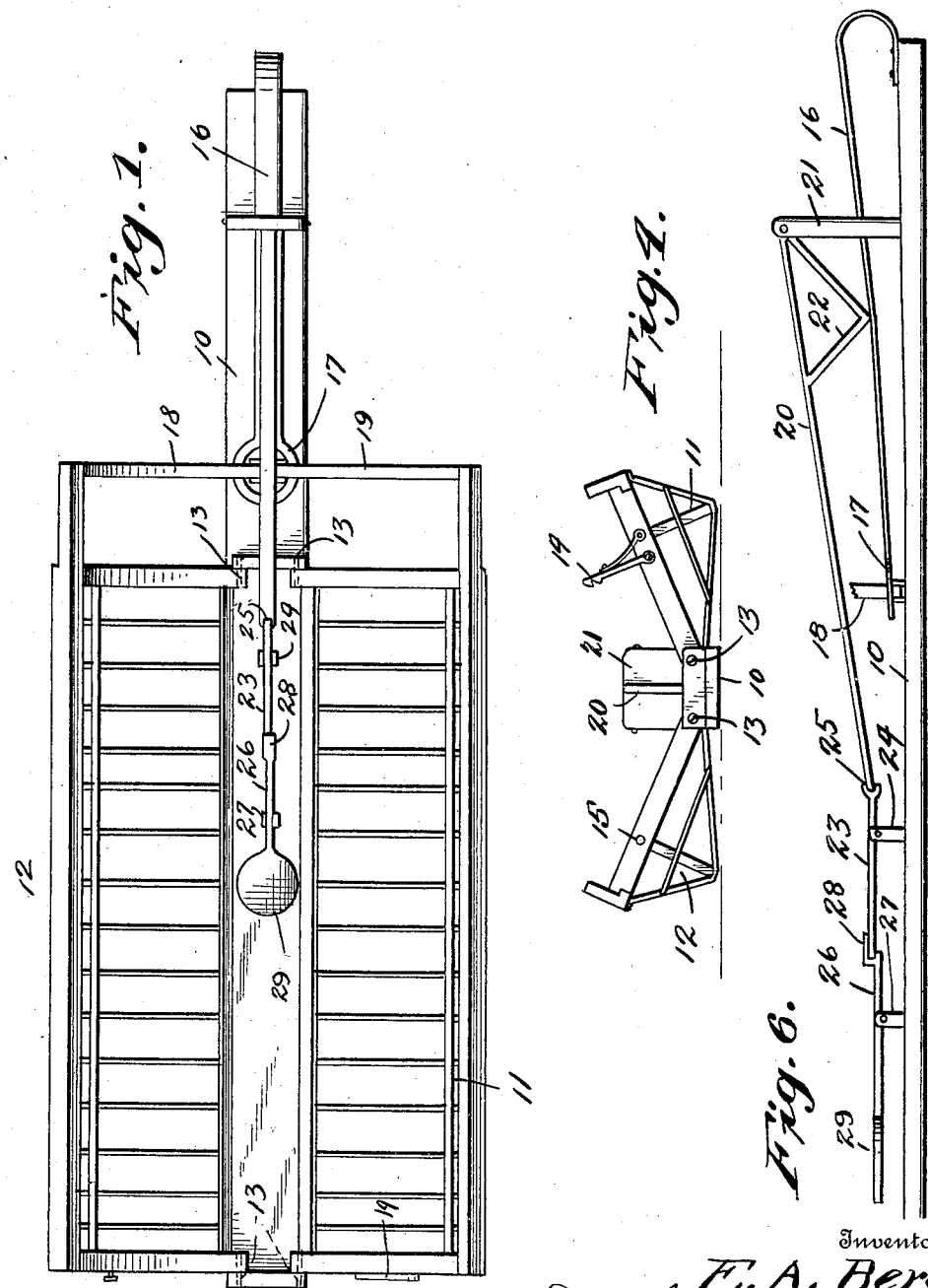

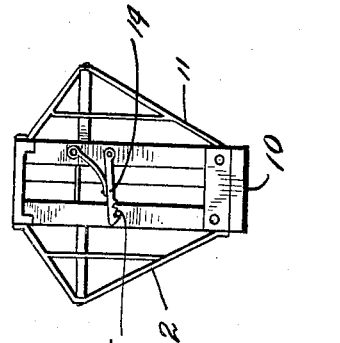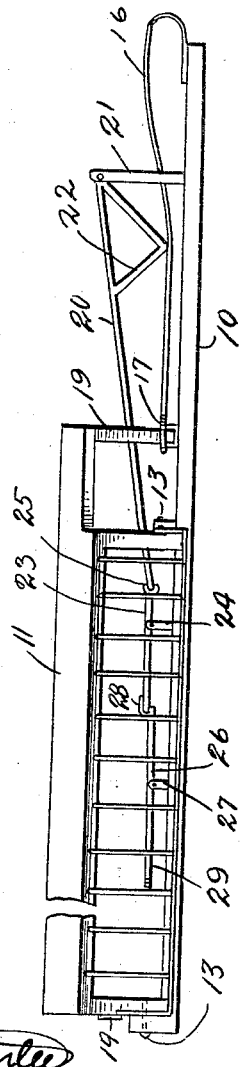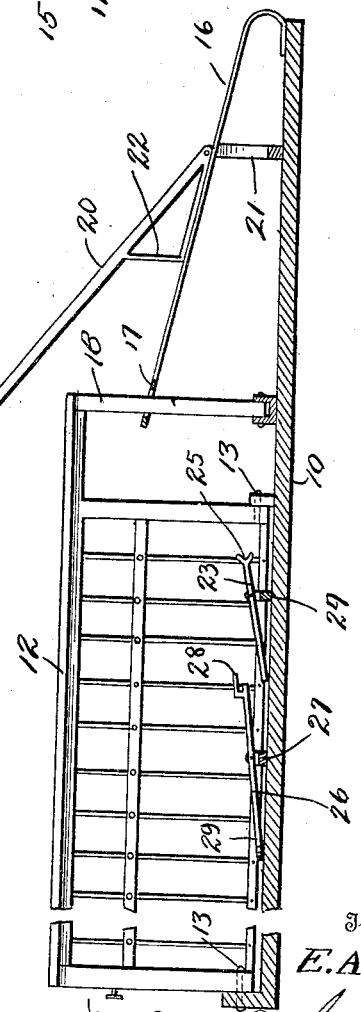

EDGAR A. BERG, OF HATTON, NORTH DAKOTA.

TRAP.

1,111,521. Specification of Letters Patent. Patented Sept. 22, 1914.

Application filed August 12, 1913. Serial No. 784,463.

*To all whom it may concern:*

Be it known that I, EDGAR A. BERG, a citizen of the United States, residing at Hatton, in the county of Traill, State of North Dakota, have invented certain new and useful Improvements in Traps; and I do hereby declare the following to be a full, clear, and exact description of the invention, such as will enable others skilled in the art to which it appertains to make and use the same.

This invention relates to traps and has for an object to provide an extremely simple trap that will operate to catch animals alive without injuring the same in any way.

A further object of the invention is to provide a trap having an extremely simple, strong and effective trap that will have wire mesh jaws of sufficient size to inclose the victim.

A still further object is to provide a trap having a tripping means that may be easily set and which will trip easily to provide a quick acting trap.

With the above objects in view the invention consists of certain novel details of construction and combination of parts hereinafter fully described and claimed; it being understood that various modifications may be made in the minor details of construction within the scope of the appended claim.

In the accompanying drawing illustrating this invention:—Figure 1 is a plan view of the trap set. Fig. 2 is a side elevation of the trap set. Fig. 3 is a longitudinal section showing the trap sprung. Fig. 4 is an end elevation showing the trap set. Fig. 5 is an end elevation showing the trap sprung. Fig. 6 is an enlarged view in elevation showing the operating mechanism of the trap.

Referring now to the drawing in which like characters of reference designate similar parts, 10 designates a base bar that extends throughout the length of the trap and supports the same. A pair of wire mesh jaws 11 and 12 of the general shape shown are hinged at the lower edges as shown at 13 to the side edges of the base bar, and when open present an inconspicuous trap, these jaws being adapted to spring upwardly and form a cage for entrapping the victim without injuring the same, as best shown in Fig. 5. For locking the jaws closed one of the jaws is formed with a spring pressed rack 14 which engages over a catch 15 on the other jaw and holds the jaws against being opened by the exertions of the entrapped animal.

The operating mechanism of the trap comprises a stiff spring 16 which is secured at one end to the end of the base bar 10 and extends toward the jaws, the spring being terminally equipped with an eye 17 which engages rods 18 and 19 of the jaws 11 and 12, such rods being included as portions of the jaw frames. Upon the jaws being pressed open, these rods rock down to a horizontal position whereby the spring is compressed as shown in Fig. 1 and Fig. 6. For compressing the spring to set the trap a trigger 20 is hinged at the rear end to a bracket 21 carried by the base bar and is provided on the underneath side with a substantially triangular block 22 which bears upon the spring and upon depression of the trigger depresses the spring. The trigger extends along the base bar and terminates within the inclosure of the jaws where it is caught and held to hold the trap set. A trigger catch 23 is pivoted intermediate its ends on a standard 24 within the trap and is provided at the rear end with a notch 25 for the reception of the free end of the trigger. A bait lever 26 is pivoted intermediate its ends on a bracket 27 disposed on the base bar and is provided at the rear end with a forked end 28 to receive the free end of the trigger catch, and is provided at the front end with a plate 29 for the reception of the bait. It is to be observed that the upper arm of this forked end 28 is longer than the lower arm so that when in the position shown in Fig. 6 the lever 23 locks in the forked end.

To set the trap the jaws are pressed open in a similar manner to setting an ordinary spring jaw rat trap, the trigger 20 being then depressed from the position shown in Fig. 3 to the position shown in Fig. 6 and engaged with the trigger catch, the latter being then engaged with the bait lever. The animal in trying to remove the bait from the bait plate dislodges the bait lever from the trigger catch whereby the latter is released and frees the trigger whereby the pressure of the latter being removed from the spring, the spring will expand and close the jaws with a resultant entrapping of the animal.

From the above description it will be seen that I have provided an extremely simple and durable trap that is formed from a few strong parts that will not easily get out of order.

What is claimed, is:—

A trap including a base bar, a pair of opposite wire mesh jaws hinged to said bar, a leaf spring secured to said bar and having a terminal eye loosely receiving frame portions of said jaws, depression of said jaws to open position serving to tension said spring, a trigger hinged to said bar and having a projection on the bottom face designed to bear upon and hold said spring tensioned when the trigger is cocked, a trigger catch pivoted intermediate the ends on said bar and having a notch in the rear end adapted to receive the tip of said trigger when the latter is cocked, and a bait lever pivoted intermediate the ends of said bar and having a forked rear end adapted to receive the front end of said trigger catch, the upper arm of said forked end being longer than the lower end thereof.

In testimony whereof, I affix my signature, in the presence of two witnesses.

EDGAR A. BERG.

Witnesses:
E. M. ERSTAD,
JOHN LARSON.